United States Patent
Amsler

[11] 3,815,143
[45] June 4, 1974

[54] VEHICLE TACHOGRAPH

[76] Inventor: Max Amsler, Lerchenweg 2, 2500 Biel, Switzerland

[22] Filed: July 5, 1973

[21] Appl. No.: 376,803

[30] Foreign Application Priority Data
July 7, 1972 Switzerland.................. 10221/72

[52] U.S. Cl.................................. 346/21, 346/45
[51] Int. Cl............................................. G01d 9/30
[58] Field of Search........................ 346/21, 18, 45

[56] References Cited
UNITED STATES PATENTS
| | | | |
|---|---|---|---|
| 1,252,102 | 1/1918 | Erdle | 346/21 |
| 2,975,016 | 3/1961 | Amsler | 346/21 X |
| 3,501,768 | 3/1970 | Vogtlin | 346/45 |

*Primary Examiner*—Joseph W. Hartary
*Attorney, Agent, or Firm*—Werner W. Kleeman

[57] ABSTRACT

A vehicle tachograph intended to be connected with a tachometer shaft, comprising a housing, a rotor arranged for rotation within said housing, the rotational speed of the rotor being proportional to the speed of the vehicle. At least one ring-shaped disk is coaxially secured to the rotor, said ring-shaped disk being provided at its entire periphery with radially protruding tongues. A support portion interrupted at one location is fixedly secured to the housing and extends along the path of the free ends of the tongues. A control element is arranged at the region of such interruption and a switching mechanism cooperates with the control element for moving the control element briefly from one terminal position into another terminal position. There is further provided a second rotor and a motor drive for the second rotor for imparting thereto rotational movement, so that it only carries out one revolution in a predetermined time interval of a number of hours. A further ring-shaped disk having radially protruding tongues is secured to the second rotor, said ring-shaped disk of the second rotor being similar to the ring-shaped disk of the first rotor and likewise having a second support portion, a second control element arranged at the region of the interruption thereof. The second control element cooperates with the tongues of the second ring-shaped disk in the same manner as the corresponding control element cooperates with the tongues of the first ring-shaped disk. A drive mechanism is provided between the first rotor and the second control element, so that the second control element assumes one terminal position only when the rotor carries out a rotational movement corresponding to travel of the vehicle, otherwise however assumes its other terminal position.

6 Claims, 3 Drawing Figures

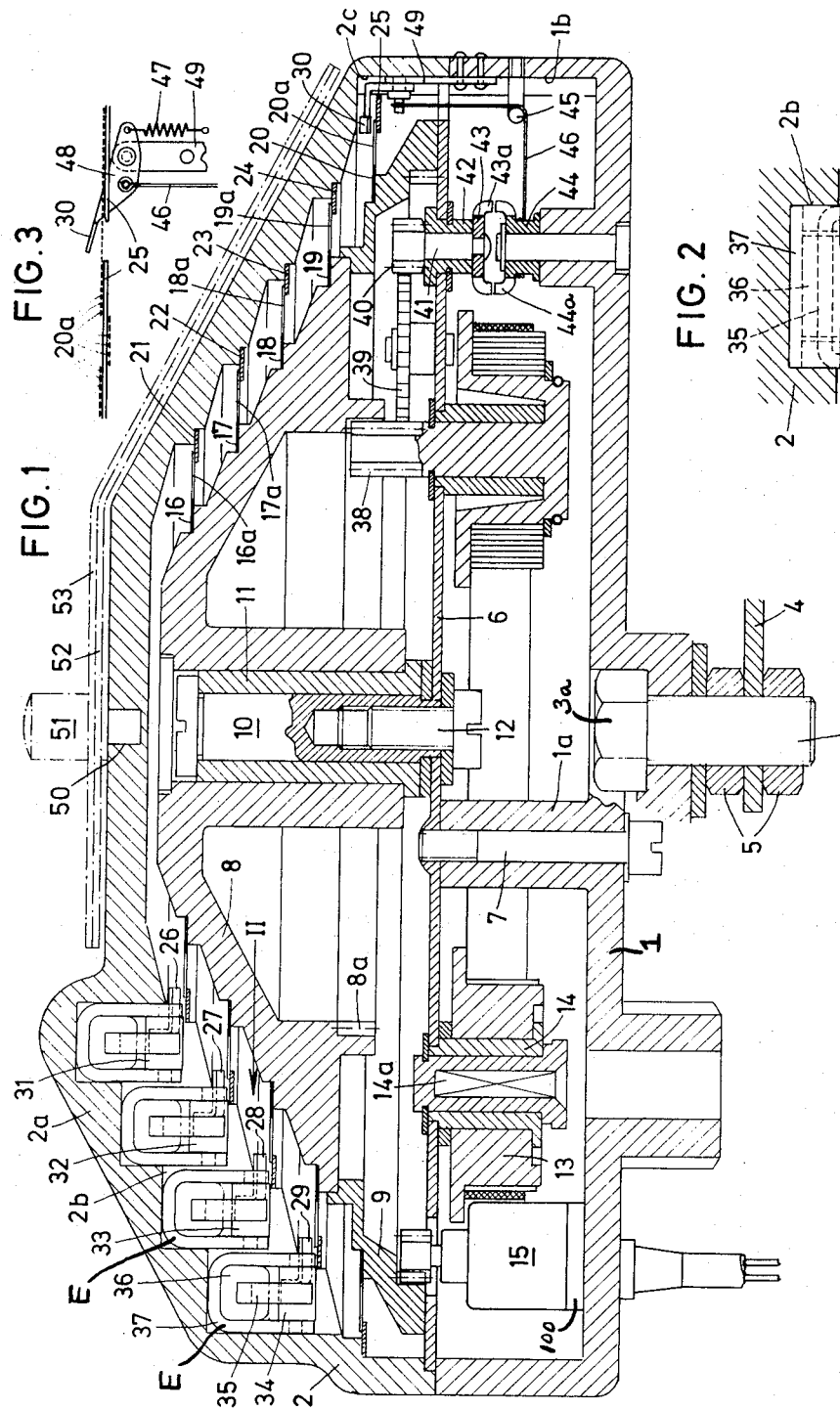
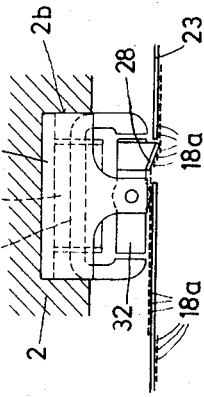

VEHICLE TACHOGRAPH

BACKGROUND OF THE INVENTION

The present invention relates to a new and improved construction of vehicle tachograph intended to be connected to a tachometer shaft, so that the rotational speed of a rotor arranged in a housing is proportional to the speed of the vehicle, wherein at least one ring-shaped disk formed of an elastic plastic material and having a thickness less than 1/10 millimeters is coaxially secured to the rotor, and at the entire periphery of this ring-shaped disk there radially depend tongues. Furthermore, there is provided a support portion which is fixed at the housing and is interrupted at one location, the support portion extending along the path of the free tongue ends, a control element is arranged at the region of such interruption, the control element being briefly moved from one terminal position into the other terminal position by a switch mechanism during regular time intervals of less than one second, wherein in one termimal position of the control element the latter bends the tongues which move past the interruption of the support portion and such tongues are forced in the bent condition to finally move above or below a rib or ribs or the support portion until they again arrive at the interruption, whereas the control element in its other terminal position does not influence the tongues which move therepast, so that such can move beneath or above the support portion and past the latter.

Now in Swiss Pat. No. 340,362 and my corresponding U.S. Pat. No. 2,975,016, granted Mar. 14, 1961, there is illustrated and described such general type of tachograph wherein the rotor thereof, apart from the previously mentioned ring-shaped disks with the tongue rims for the temporary recordal of the speed, also carries a number of similar ring-shaped disks each having a respective tongue rim, and wherein such other ring-shaped disks and tongue rims together with individually therewith cooperatively arranged support rings, switch elements and electromagnetic switch element actuation devices serve for indicating the "ON"- and "OFF"- operating state of the light flicking switch and horn, the headlight actuating switch, the turn indicators and the brake lights during the last transpired portion of travel of, for instance, 300 meters. Such indications, or at least individual ones thereof, can be very useful to determine the cause of an accident in which there has been involved the vehicle equipped with such vehicle tachograph. It has however been faulted that the thus constructed vehicle tachograph is not capable of providing an indication regarding the distribution of the rest of inactive times and travel times during the course of a time period of, for instance, 30 hours preceding the reading operation. Such indication provides interesting information concerning the maintenance of prescribed periods of inactivity of the vehicle (for instance in the case of taxi drivers) and concerning possible tiring of the driver. Such desired indication, however, cannot be merely obtained by simply adding a further ring-shaped disk with a tongue rim to the aforementioned rotor in addition to the associated support portion and switch element, and so forth, because the rotor only can be driven proportional to the vehicle speed when the vehicle is moving.

SUMMARY OF THE INVENTION

Hence, it is a primary object of the present invention to provide an improved vehicle tachograph of the previously mentioned type which effectively overcomes the aforementioned shortcomings of the prior art constructions.

Now in order to implement this object, and others which will become more readily apparent as the description proceeds, the vehicle tachograph of the present development is manifested by the features that;

a. it possesses a second rotor, to which there is imparted by means of a motor drive a rotational movement which is uniform or consists of brief indexing or switching steps, so that during one time interval of a number of hours, for instance, 30 hours, it only carries out one revolution;

b. at the second rotor, just as was the case for the first, there is secured an associated ring-shaped disk with radially depending tongues, with which there is likewise associated a second support portion and a second control element arranged at the region of the interruption thereof, and the cooperation of which with the tongues of the second ring-shaped disk is the same as that of the previously mentioned control element with the tongues of the previously mentioned ring-shaped disk, wherein however a drive mechanism is provided between the aforesaid rotor and the second control element, so that such can only then assume its one terminal position when said rotor effectively receives a rotational movement —in other words when the vehicle is traveling— otherwise however assumes its other terminal position.

BRIEF DESCRIPTION OF THE DRAWING

The invention will be better understood and objects other than those set forth above, will become apparent when consideration is given to the following detailed description thereof. Such description makes reference to the annexed drawing wherein:

FIG 1 schematically illustrates partially in elevational view and partially in cross-sectional view a preferred exemplary embodiment of vehicle tachograph;

FIG. 2 is a view looking in the direction of the arrow II of FIG. 1, showing details of the arrangement of FIG. 1; and FIG. 3 illustrates further details of the arrangement of FIG. 1.

DETAILED DESCRIPTION OF THE PREFERRED EMBODIMENTS

Describing now the drawing, the illustrated exemplary embodiment of recording apparatus e.g. tachograph will be understood to comprise a housing or case composed of the housing portion 1 formed, for instance, of glass fiber-reinforced plastic and the housing portion 2 composed of, for instance, glass-clear or transparent plastic. In the housing portion 1 there is fixedly seated the head 3a of a threaded bolt 3 which serves to attach the tachograph at a portion 4 of the vehicle by means of the nut members 5. A plate 6 is fixedly seated between the housing portions 1 and 2, this plate 6 being secured by means of a screw 7 or the like at the housing portion eyelet or boss 1a. With the exception of, among other things, a bowed-out or extended portion 2a and an inner stepped recess 2b of the housing portion 2 located at the region of the bowed portion 2a, and furthermore, the eyelets or bosses such as 1a at the housing portion 1 and the aligned inner recesses 2c, 1b, such housing portions 1 and 2 have a generally rotationally symmetrical internal and external shape with regard to a common axis. The aforementioned axis coincides with the common axis of rotation of a first rotor 8 and a second rotor 9. Moreover, the major jacket or outer surface portions of the housing portion 2 and the rotor 8 are conical. The bearing parts 10, 11 and 12 serve for the rotatable and axial non-movable mounting of the rotor 8. The rotor 9 is rotatably mounted at the rotor 8 and is retained so as to be axially non-movable between such rotor 8 and the plate 6.

The rotor 8 receives its rotational movement through the agency of a belt drive arrangement which has been collectively identified by reference character 13, wherein at the tachograph the element 14 is provided with an internal hexagonal bore 14a for the connection of a tachometer shaft, so that the rotational speed of the rotor 8 is proportional to the speed of the vehicle. On the other hand, the rotor 9 has imparted thereto a very slow rotational speed which may be uniform or can consist of brief indexing or switching steps, by means of small electric motor-transmission unit or other suitable drive, as generally indicated by reference character 15, so that such rotor carries out one revolution in, for instance, 30 hours.

The rotor 8 is provided with four flat ring-shaped or annular surfaces at its generally conical outer or jacket surface and at such four flat ring-shaped surfaces there is fixedly adhesively bonded a respective flat ring-shaped or annular disk 16, 17, 18 and 19 formed of an elastic plastic material, such as for instance "MYLAR," the thickness of which is less than 1/10 mm. At a flat ring-shaped or annular surface of the rotor 9 there is adhesively bonded a ring-shaped or annular disk 20 of a thickness less than 1/10 mm. and also formed of such plastic material. All of these ring-shaped disks 16 to 20 are reduced as regards their internal- and external diameters in the manner of a row of steps, so that the inner diameter of one such ring-shaped disk is equal to the outer diameter of the next smaller ring-shaped disk, as best recognized by referring to FIG. 1. All of these disks 16 to 20 are provided at their periphery with a gapless rim of radially depending tongues 16a, 17a, 18a, 19a and 20a respectively. Along the path of the free tongue ends there is provided for each tongue rim a flat support ring or support surface 21, 22, 23, 24 and 25 respectively, which is fixedly bonded at an associated ring-shaped surface of the transparent housing portion 2, and each such flat support ring is interrupted at one location of its periphery, for instance as depicted for support ring 25 in FIG. 3. These support rings 21 to 25 which are formed, for instance, of anodised aluminum sheet metal are also reduced as concerns their diameter in the manner of a row of steps. At the region of each such interruption there is provided for each tongue rim a control element 26, 27, 28, 29 and 30 respectively, which can be shifted between two terminal positions, and which in the one terminal position bend-out the tongues which move past the interruption of the associated support ring and force such in the bent or deflected condition to move away over (or also according to a modification if desired below) the support surface of the associated support ring until they again arrive at the interruption, whereas in the other terminal position the tongues which move therepast remain uninfluenced i.e. ar not bent, so that they can move below or above the support portion or surface and past such. This function has been depicted for the tongues 18a in FIG. 2 and has already been described in detail in the previously mentioned Swiss and United States patents, so that further discussion thereof is not believed to be necessary. The control elements 26 to 29 are secured to a respective pivotal armature 31, 32, 33, 34 of an associated electromagnet E defining the respective switch mechanism. The stator iron 35 of the stators with the coils 36 are each accommodated in a small housing 37 which is mounted at the pivot pin or journal of the associated armature. All of these housings 37 are fixedly retained in the associated and appropriate sections of the recess 2b which is located beneath the bowed portion or bead 2a of the housing portion 2. That of the coil 36, which is associated with the control element 29, is connected with an inexpensive electrical clock or timer (not particularly shown, for instance arranged at component 15 and schematically indicated by reference character 100), which delivers thereto, for instance each second half-second, current, in order that the control or switch element 29 can be moved in intervals of ½ second from the one into the other terminal position. The tongues 19a at the ring-shaped disk 19 may serve to temporarily record the speed of the vehicle. The coils 36 which are associated with the control or switching elements 26, 27 and 28 respectively, are for instance connected to the brake light, the vehicle indicator turn "left" signal light, and the vehicle indicator turn "right" signal light, respectively, for temporarily recording such functions during, for instance, the last 300 meters of vehicle travel, which it is to be understood is strictly an arbitrarily selected value.

On the other hand, the control element 30, which is associated with the ring-shaped disk 20 and the tongues 20a thereof secured to the rotor 9, has a drive connection, which will be described in greater detail hereinafter, with the rotor 8 which is driven from the tachometer shaft, so that it can only assume its one terminal position when this rotor effectively receives a rotational movement —in other words when the vehicle is moving— otherwise it assumes its other terminal position. The rim of tongues 20a therefore serves to temporarily store and indicate the travel- and the stationary times during the last expired 30 hours which the rotor 9 requires in order to complete one revolution.

In the illustrated exemplary embodiment, the aforementioned drive connection is formed by a pinion 38, by means of which the belt drive arrangement 13 transmits the rotation of the tachometer shaft to the rotor 8 provided with internal teeth 8a, an intermediate gear 39 mounted at the plate 6, a pinion 40 with a shaft 41 which rotates in a bearing 42 fixedly retained at the plate 6 and at the lower end of which there is fixedly seated an iron disk 43 provided with teeth 43a forming bent-out and permanent magnetic poles, a cable roller 44 with teeth 44a which are flexed in the direction of the teeth 43a, a nylon cord or cable 46 which is deflected about a stationary deflecting element 45 and a lever 48 which is loaded by spring 47 (FIG. 3). The lever 48 is mounted at a support element 49 which is secured at the region of the recesses 1b, 2c at the housing portion 1. The control element 30 is constructed as a laterally bent-out flap or tab at such lever 48. The teeth 43a, 44a, form a magnetic slip coupling or clutch of conventional design which renders possible unhindered further rotation of the components 38, 8, 39, 41 and 43 after carrying out actuation of the lever 48.

The previously mentioned electro-timer or clock mechanism which delivers current each second ½ second to the coil 36 associated with the control element 29 (for recording the speed of the vehicle) advantageously also serves to deliver current pulses to a stepping or indexing motor serving to drive the rotor 9 so that such carries out a complete revolution in, for instance, 30 hours.

The support ring disks 21, 22, 23, 24, 25 carry suitably calibrated scales at the sides thereof which face away from the housing portion 1.

The housing portion 2 is provided with a central blindhole bore 50. Into this blindhole bore 50 there can be inserted the connection portion of a bearing pin 51, at which there is rotatably mounted the arms 52, 53 formed of transparent material of an evaluation device, by means of which, when necessary, there can be easily evaluated the indications delivered by the tongue rims in connection with the support rings and their scales, for instance the vehicle speed, as fully disclosed in the afore-mentioned patents incorporated herein by reference.

While there is shown and described present preferred embodiments of the invention, it is to be distinctly understood that the invention is not limited thereto, but may be otherwise variously embodied and practiced within the scope of the following claims.

What is claimed is:

1. A vehicle tachograph intended to be connected with a tachometer shaft, comprising a housing, a first rotor arranged for rotation within said housing, the rotational speed of the rotor being proportional to the speed of the vehicle, at least one ring-shaped disk formed of elastic plastic material, said ring-shaped disk having a thickness less than 1/10 millimeter and being coaxially secured to the rotor, said ring-shaped disk being provided at its entire periphery with radially protruding tongues, a support portion interrupted at one location, said support portion being fixedly secured to the housing and extending along the path of the free ends of the tongues, a control element arranged at the region of such interruption, a switching mechanism cooperating with the control element for moving the control element briefly from one terminal position into another terminal position in less than one second and during regular time intervals, wherein in on terminal position of the control element the tongues which move past the interruption of the support portion are bent-out by the control element and thus are forced in the bent state to move past the support portion until they again arrive at the region of the interruption, whereas the control element in its other terminal position does not influence the tongues which move therepast, so that the tongues can move past and along the associated support portion, the improvement comprising;
   a. a second rotor;
   b. a motor drive means for the second rotor for imparting thereto a rotational movement, so that said second rotor only carries out one revolution in a predetermined time interval of a number of hours;
   c. a further ring-shaped disk having radially protruding tongue secured to the second rotor, said further ring-shaped disk of the second rotor being similar to said at least one ring-shaped disk of the first rotor;
   d. said further ring-shaped disk being equipped with a second support portion interrupted at one location, a control element arranged at the region of the interruption thereof, said control element for the further ring-shaped disk cooperating with the tongues of the further ring-shaped disk in the same manner as the other control element cooperating with the tongues of said at least one ring-shaped disk; and
   e. a drive mechanism arranged between the first rotor and the control element for the further ring-shaped disk, so that the last-mentioned control element assumes one terminal position only when the first rotor carries out a rotational movement corresponding to travel of the vehicle, otherwise assumes its other terminal position.

2. The vehicle tachograph as defined in claim 1, wherein the motor drive means for the second rotor imparts thereto a uniform rotational movement.

3. The vehicle tachograph as defined in claim 1, wherein the motor drive means imparts to the second rotor a rotational movement consisting of brief indexing steps.

4. The vehicle tachograph as defined in claim 1, further including electro-timer means cooperating with said switching mechanism, by means of which the control element for said at least one ring-shaped disk is moved in regular time intervals of less than one second from the one into the other terminal position, said electro-timer means being associated with the motor drive means of the second rotor.

5. The vehicle tachograph as defined in claim 1, wherein the drive mechanism comprises gear transmission means for reducing the rotary drive of the first rotor, a slip coupling having a driven portion, a cord roller rigidly connected for rotation with the driven portion of such slip coupling and a cord which connects the cord roller with the control element of the further ring-shaped disk.

6. The vehicle tachograph as defined in claim 5, wherein the slip coupling comprises a magnetic coupling.

* * * * *